United States Patent
Eizumi et al.

(10) Patent No.: US 11,333,833 B2
(45) Date of Patent: May 17, 2022

(54) ALIGNMENT METHOD

(71) Applicant: Panasonic Intellectual Property Management Co., Ltd., Osaka (JP)

(72) Inventors: Kiyotaka Eizumi, Osaka (JP); Makoto Ryudo, Hyogo (JP); Doukei Nagayasu, Hyogo (JP); Hitoshi Nishimura, Osaka (JP); Jingbo Wang, Hyogo (JP); Masatoshi Nishio, Osaka (JP); Hideaki Yamaguchi, Osaka (JP); Yoshiaki Takenaka, Osaka (JP); Ryo Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/466,404

(22) PCT Filed: Nov. 29, 2017

(86) PCT No.: PCT/JP2017/042715
§ 371 (c)(1),
(2) Date: Jun. 4, 2019

(87) PCT Pub. No.: WO2018/105453
PCT Pub. Date: Jun. 14, 2018

(65) Prior Publication Data
US 2019/0293873 A1    Sep. 26, 2019

(30) Foreign Application Priority Data

Dec. 6, 2016 (JP) .............................. JP2016-236401

(51) Int. Cl.
*G02B 6/32* (2006.01)
*B23K 26/03* (2006.01)
(Continued)

(52) U.S. Cl.
CPC .............. *G02B 6/32* (2013.01); *B23K 26/032* (2013.01); *B23K 26/0608* (2013.01);
(Continued)

(58) Field of Classification Search
None
See application file for complete search history.

(56) References Cited

U.S. PATENT DOCUMENTS 5,815,626 A    9/1998  Kuba et al.
7,526,167 B1 *  4/2009  Minelly ............. G02B 6/03633
                                                       359/341.3
(Continued)

FOREIGN PATENT DOCUMENTS

JP    3-4858     4/1987
JP    8-82724    3/1996
(Continued)

OTHER PUBLICATIONS

International Search Report dated Mar. 6, 2018 in International (PCT) Application No. PCT/JP2017/042715.
(Continued)

*Primary Examiner* — Chris H Chu
(74) *Attorney, Agent, or Firm* — Wenderoth, Lind & Ponack, L.L.P.

(57) ABSTRACT

There is provided an optical axis alignment mechanism between the laser oscillator and the optical fiber. The laser oscillator emits laser light, which then emerges from the emission end of the optical fiber via the axis alignment mechanism. Part of the laser light is received on the light-receiving surface of the CCD camera of a laser light evaluator. Thus, the laser light evaluator acquires a light intensity distribution. The light intensity distribution is used by the optical axis alignment mechanism to align the axis of the laser oscillator with the axis of the optical fiber.

5 Claims, 8 Drawing Sheets

(51) Int. Cl.
  *B23K 26/06* (2014.01)
  *G02B 6/26* (2006.01)
  *G02B 6/42* (2006.01)
  *H01S 5/022* (2021.01)

(52) U.S. Cl.
  CPC ...... *B23K 26/0643* (2013.01); *B23K 26/0648* (2013.01); *B23K 26/0665* (2013.01); *G02B 6/262* (2013.01); *G02B 6/4206* (2013.01); *G02B 6/4225* (2013.01); *G02B 6/4227* (2013.01); *H01S 5/022* (2013.01); *G02B 6/4226* (2013.01); *G02B 6/4296* (2013.01)

(56) References Cited

U.S. PATENT DOCUMENTS

| | | | | |
|---|---|---|---|---|
| 2002/0118918 A1* | 8/2002 | Goldberg | ............ | G02B 6/4214 385/31 |
| 2003/0058493 A1* | 3/2003 | Fujita | ............... | G02B 6/4206 398/5 |
| 2004/0240326 A1* | 12/2004 | Aoyama | ............... | G11B 7/005 369/13.24 |
| 2011/0043931 A1* | 2/2011 | Li | ..................... | G02B 13/0005 359/739 |
| 2012/0051084 A1* | 3/2012 | Yalin | ..................... | G02B 6/005 362/553 |
| 2015/0049987 A1* | 2/2015 | Grasso | ................. | B23K 26/00 385/33 |
| 2015/0139638 A1 | 5/2015 | Ma et al. | | |
| 2017/0242204 A1* | 8/2017 | Collier | ................ | G02B 6/4292 |

FOREIGN PATENT DOCUMENTS

| | | |
|---|---|---|
| JP | 8-167754 | 6/1996 |
| JP | 2004-61868 | 2/2004 |
| JP | 2005-77436 | 3/2005 |
| JP | 2007-173649 | 7/2007 |
| JP | 2013-057854 | 3/2013 |
| JP | 2016-112609 | 6/2016 |

OTHER PUBLICATIONS

Extended European Search Report dated Oct. 17, 2019 in corresponding European Patent Application No. 17879241.2.

* cited by examiner

ALIGNMENT METHOD

This application is a U.S. national stage application of the PCT International Application No. PCT/JP2017/042715 filed on Nov. 29, 2017, which claims the benefit of foreign priority of Japanese patent application No. 2016-236401 filed on Dec. 6, 2016, the contents all of which are incorporated herein by reference.

TECHNICAL FIELD

The present invention relates to a method for optical axis alignment between the laser oscillator and the optical fiber in laser processing devices.

BACKGROUND ART

There are known laser processing devices used for welding or processing workpieces by guiding laser light emitted from a laser oscillator such as a gas laser or a solid-state laser through an optical fiber.

It has been common to align the axis of the laser oscillator with the axis of the optical fiber in order to enhance their coupling efficiency, thereby ensuring the laser light output used for processing.

A well-known optical-axis alignment technique (e.g., Patent Literature 1) is performed as follows. The laser light emitted from the laser oscillator is entered to one end of the optical fiber via an optical member such as a condenser lens, and the laser light emerging from the other end of the optical fiber is measured for the output with a power meter, a light receiving element, or other similar devices. The position and other conditions of the condenser lens are adjusted to maximize the output.

CITATION LIST

Patent Literature

PTL 1: Japanese Unexamined Patent Application Publication No. 8-167754

SUMMARY

There has been a growing demand for high processing precision in recent years, making it important to control the shape of the laser beam applied to the workpieces.

However, the condenser lens position where the laser beam power is maximum does not necessarily coincide with the condenser lens position where the laser beam shape is favorably modified. Hence, when an axis alignment process is completed with the condenser lens fixed at the former position, it is not always possible to obtain a desired laser beam shape. This may cause the axis alignment process to be repeated over again, thus decreasing the work efficiency.

In view of these problems, an object of an aspect of the present invention is to provide a method for optical axis alignment based on the monitoring result of the light intensity distribution of the laser beam.

In order to achieve the above object, according to the aspect of the present invention, the optical axis alignment between the laser oscillator and the optical fiber is based on the light intensity distribution on the light-receiving surface of the light-receiving unit.

To be more specific, the method for the optical axis alignment according to the aspect of the present invention is a method for optical axis alignment between a laser oscillator and an optical fiber by using a laser light evaluator. The laser light evaluator includes a light-receiving unit having a light-receiving surface configured to receive laser light emitted from the laser oscillator and guided by the optical fiber. The method includes the following steps: receiving laser light on the light-receiving surface of the light-receiving unit, the laser light having been emitted from the laser oscillator and guided by the optical fiber via an axis alignment mechanism situated between the laser oscillator and the optical fiber; and aligning the axis of the laser oscillator with the axis of the optical fiber using the axis alignment mechanism based on the light intensity distribution of the laser light received on the light-receiving surface of the light-receiving unit.

According to this method, the light intensity distribution of the laser light received on the light-receiving surface is used for the optical axis alignment between the laser oscillator and the optical fiber. This method provides high accuracy of the axis alignment and also enables the final output laser light to have an appropriate shape.

The aligning is preferably performed such that the laser light radiated from the optical fiber has a minimum numerical aperture, the numerical aperture being derived from the light intensity distribution on the light-receiving surface.

According to this method, the optical axis alignment between the laser oscillator and the optical fiber is performed so as to minimize the numerical aperture derived from the light intensity distribution on the light-receiving surface. As a result, the spot diameter of the final output laser light can be reduced as desired.

The optical fiber is preferably a double-clad fiber, and the aligning is preferably performed based on a position where the intensity has a second peak appearing in the light intensity distribution on the light-receiving surface.

This method can improve the accuracy of the optical axis alignment between the laser oscillator and the double-clad fiber and also enable the final output laser light to have an appropriate shape.

The laser light evaluator preferably further includes the following: a mirror unit configured to deflect, toward the light-receiving unit, part of the laser light radiated from the optical fiber; an fθ lens configured to modify the shape of the laser light deflected by the mirror unit such that the radiation angle distribution of the laser light is converted into a position distribution; a field lens configured to transmit the laser light with the shape modified by the fθ lens and to change the direction of travel of the laser light; a neutral-density filter configured to attenuate the laser light that has passed through the field lens; and an image-forming lens configured to collect the laser light that has been attenuated by the neutral-density filter onto the light-receiving surface.

According to this structure, the radiation angle distribution of the laser light can be converted into the light intensity distribution on the light-receiving surface, thereby facilitating the optical axis alignment between the laser oscillator and the optical fiber.

As described above, the method according to the aspect of the present invention can improve the accuracy of the optical axis alignment between the laser oscillator and the optical fiber and also enable the final output laser light to have an appropriate shape.

BRIEF DESCRIPTION OF DRAWINGS

FIG. 2 illustrates some spectral characteristics of the mirror unit.

DESCRIPTION OF EMBODIMENTS

The exemplary embodiments of the present invention will be described in detail as follows with reference to the drawings. These exemplary embodiments are merely examples of the present invention and do not limit the application or use of the present invention.

First Exemplary Embodiment

Figure 1:
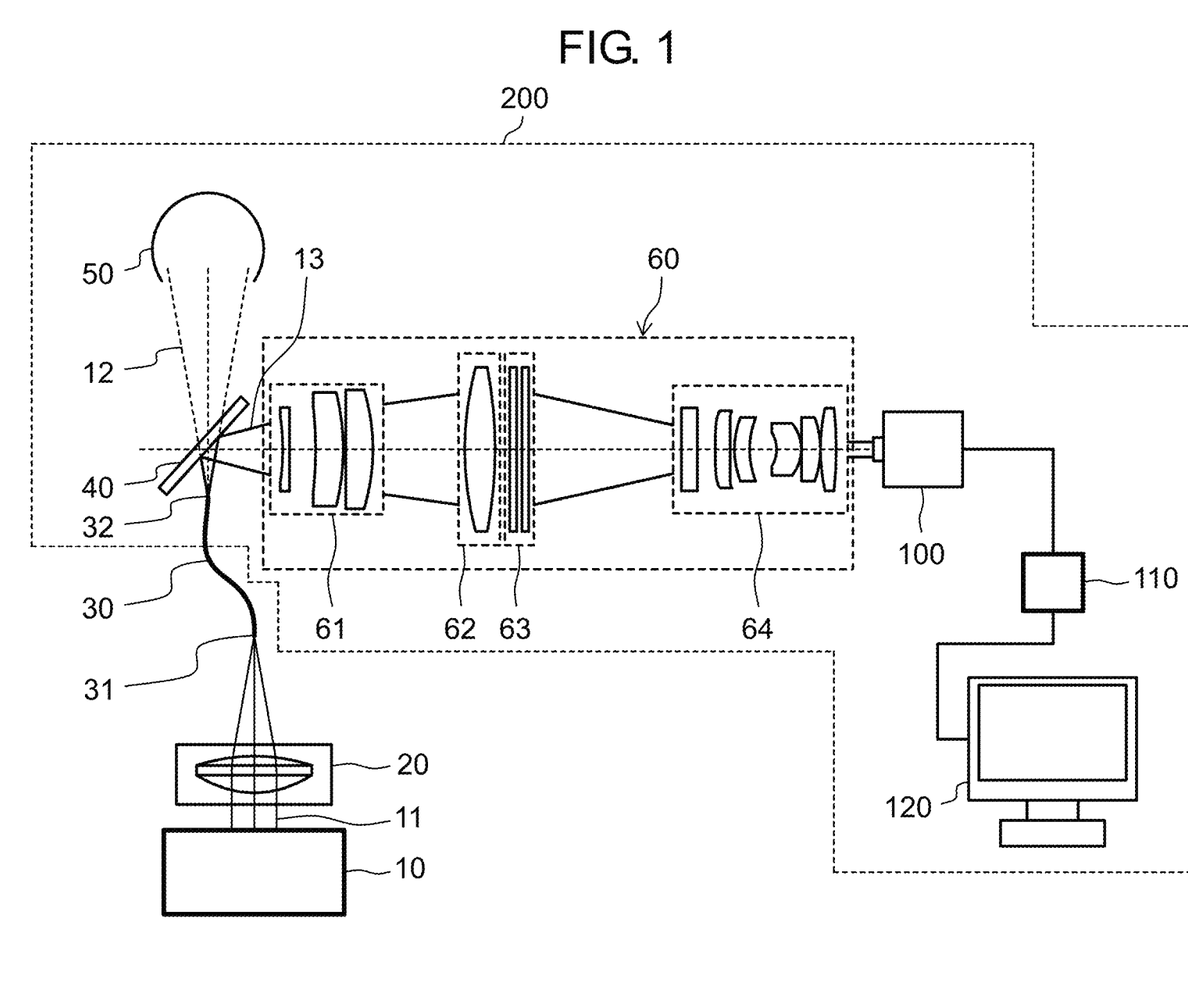
FIG. 1 illustrates the placement of the various kinds of devices used for the optical axis alignment between the laser oscillator and the optical fiber according to a first exemplary embodiment of the present invention.

FIG. 1 illustrates the placement of the various kinds of devices used for the optical axis alignment between laser oscillator 10 and optical fiber 30 according to a first exemplary embodiment of the present invention. Between laser oscillator 10 and optical fiber 30, there is provided axis alignment mechanism 20. Laser oscillator 10 emits laser light 11. Optical fiber 30 guides laser light 11 emitted from laser oscillator 10. Axis alignment mechanism 20 aligns the axis of laser oscillator 10 with the axis of optical fiber 30. FIG. 1 also illustrates laser light evaluator 200, which is disposed to receive the laser light emerging from emission end 32 of optical fiber 30 and to evaluate the characteristics of the light. In the present exemplary embodiment, optical fiber 30 is a single clad fiber.

Axis alignment mechanism 20 is generally disposed in a housing (not shown) for laser oscillator 1.

Laser light evaluator 200 includes mirror unit 40, integrating sphere 50 and light-collecting unit 60. Mirror unit 40 deflects part of laser light 11 emerging from emission end 32 of optical fiber 30 and transmits the remaining part of laser light 11. Integrating sphere 50 is a damper for absorbing and cooling laser light 12 that has passed through mirror unit 40. Light-collecting unit 60 collects laser light 13 deflected by mirror unit 40 onto the light-receiving surface of CCD camera 100.

Besides CCD camera 100, laser light evaluator 200 further includes image processor 110 and monitor 120. CCD camera 100 is a light-receiving unit having a CCD sensor (not shown) as a light-receiving surface. Camera 100 receives laser light 13 and generates an image signal. Image processor 110 processes the image signal obtained from CCD camera 100. Monitor 120 displays the images processed by image processor 110.

Light-collecting unit 60 includes fθ lens 61 and field lens 62. Fθ lens 61 is an equidistant projection lens, which converts laser light 13 deflected by mirror unit 40 into a spot with a height corresponding to the radiation angle. Field lens 62 is disposed in a position corresponding to the focal length of fθ lens 61 so as to collect laser light 13 that has passed through fθ lens 61. Light-collecting unit 60 further includes neutral-density filter 63 and image-forming lens 64. Neutral-density filter 63 attenuates laser light 13 that has passed through field lens 62. Image-forming lens 64 collects laser light 13 that has passed through neutral-density filter 63 onto the light-receiving surface of CCD camera 100.

Mirror unit 40 has the spectral characteristics shown in FIG. 2 so as to protect light-collecting unit 60 and CCD camera 100 from laser light 13. Mirror unit 40 transmits most of laser light 11.

Mirror unit 40 is a mirror made of low OH material as a measure against thermal lens effect.

Mirror unit 40 is replaceable to match all levels of laser light 11, from high to low. In the present exemplary embodiment, mirror unit 40 is a mirror with high transmittance and low reflection so as to be used for laser light 11 with an output of a kilowatt level.

After being deflected by mirror unit 40, laser light 13 is incident to fθ lens 61. Fθ lens 61 has the function of converting the incident laser light 13 into a spot with a height corresponding to the radiation angle, or in other words, converting the radiation angle distribution of laser light 13 into a position distribution.

Figure 3:
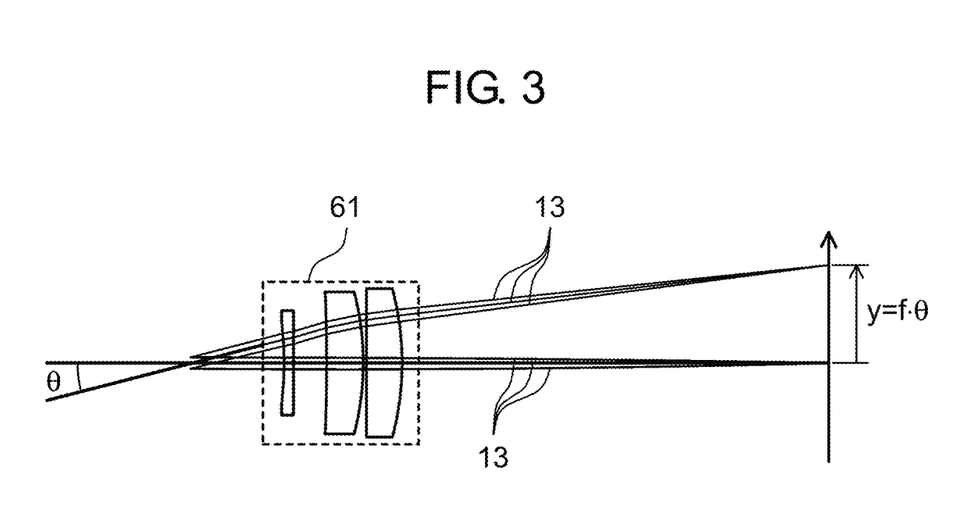
FIG. 3 is a schematic diagram illustrating some functions of the fθ lens.

As shown in FIG. 3, laser light 13 is incident to fθ lens 61 at angle θ and is collected in such a manner as to satisfy Mathematical Formula 1.

$$y = f \times \theta \quad (1)$$

where y represents the image height at the focal position of θ lens 61, f represents the focal length of fθ lens 61, and θ represents the radiation angle of laser light 13.

Fθ lens 61 has the above-mentioned characteristics. Therefore, some characteristics of laser light 13 can be obtained by observing the light intensity distribution of laser light 13 that has passed through fθ lens 61. For example, the half width of the incident angle of laser light 13 incident on fθ lens 61 can be easily found from the height, which is the half width of the peak of the light intensity distribution.

In FIG. 3, fθ lens 61 is composed of three lenses, but it may alternatively be composed of a fewer or a greater number of lenses.

Figure 4:
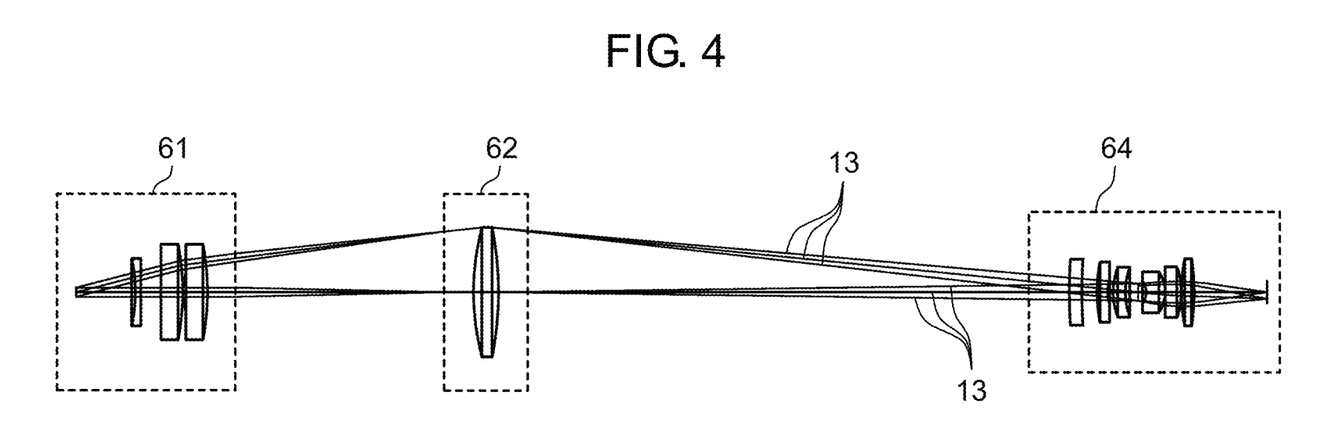
FIG. 4 is a schematic diagram illustrating some functions of the field lens.

After passing through fθ lens 61, laser light 13 is incident to field lens 62 disposed near the focal position of fθ lens 61. As shown in FIG. 4, field lens 62 changes the direction of travel of laser light 13 that has passed through fθ lens 61, and allows light 13 to be incident to image-forming lens 64. If field lens 62 were absent, laser light 13 that has passed through fθ lens 61 would continue to expand, and the light around the image would proceed outside image-forming lens 64.

Neutral-density filter 63 is omitted in FIG. 4. In FIG. 4, field lens 62 is composed of a single lens, but it may alternatively be composed of more lenses.

After passing through field lens 62, laser light 13 is incident to neutral-density filter 63. Neutral-density filter 63 has the function of attenuating the incident laser light 13 so as to adjust the light intensity on CCD camera 100. The expression "on CCD camera 100" means, more precisely, "on the CCD sensor of CCD camera 100".

Figure 5:
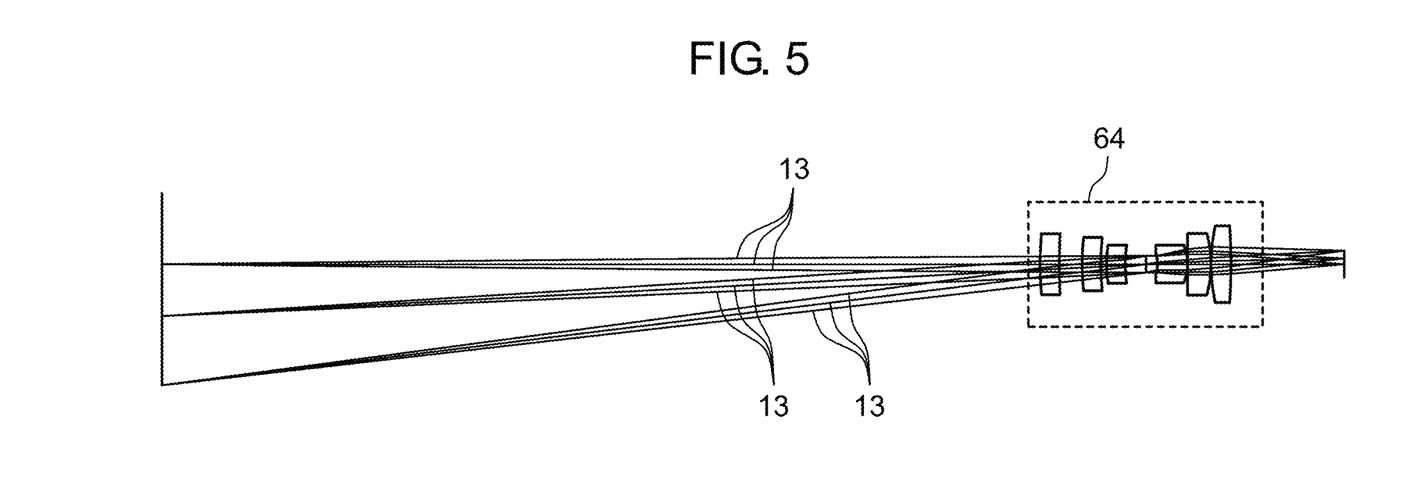
FIG. 5 is a schematic diagram illustrating some functions of the image-forming lens.

After passing through neutral-density filter 63, laser light 13 is incident to image-forming lens 64. As shown in FIG. 5, image-forming lens 64 reduces laser light 13 that has passed through fθ lens 61 by a predetermined scaling factor so as to match the sensor size of CCD camera 100.

In FIG. 5, image-forming lens 64 is composed of six lenses, but it may alternatively be composed of a fewer or greater number of lenses.

After passing through image-forming lens 64, laser light 13 is incident to CCD camera 100. CCD camera 100 is disposed such that its CCD sensor is in a position corresponding to the focal length of image-forming lens 64.

The method for the optical axis alignment between laser oscillator 10 and optical fiber 30 will be described as follows.

The light intensity distribution on CCD camera 100 is processed by image processor 110 and is displayed as images on monitor 120. While observing the light intensity distribution, axis alignment mechanism 20 aligns the axis of laser oscillator 10 with the axis of optical fiber 30. A specific method for the optical axis alignment will be described as follows.

Figure 6A:
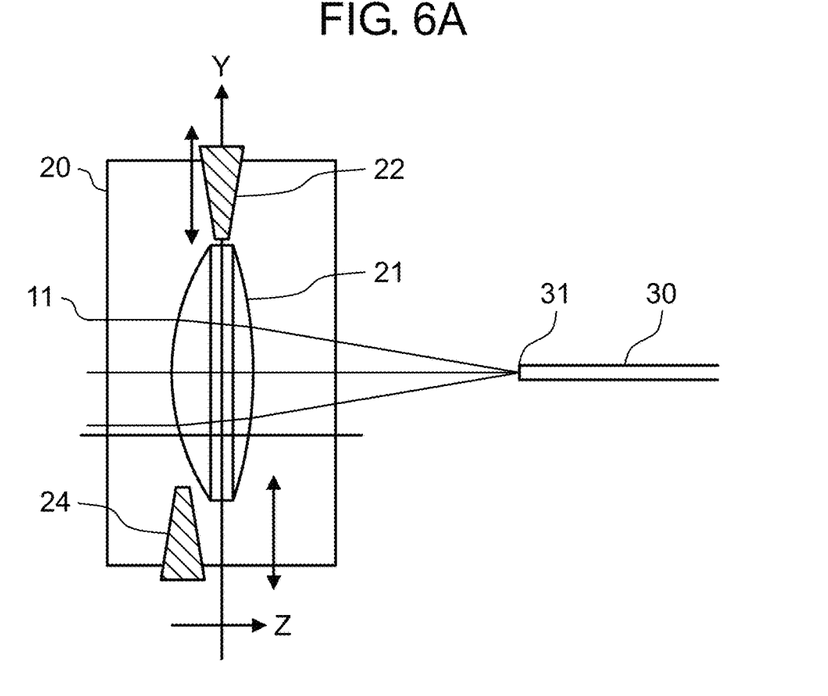
FIG. 6A is a schematic diagram illustrating the axis alignment mechanism seen from the direction orthogonal to the axis of the laser oscillator.
Figure 6B:
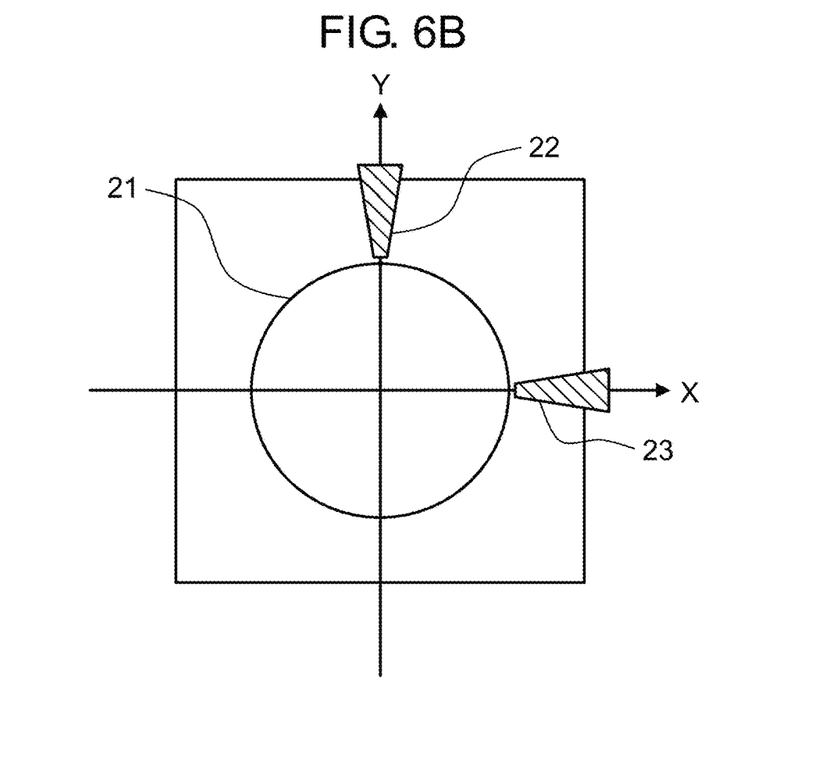
FIG. 6B is a schematic diagram illustrating the axis alignment mechanism seen along the axis of the laser oscillator.

As shown in FIGS. 6A and 6B, axis alignment mechanism 20 is composed of condenser lens 21 and lens position adjustment screws 22 to 24. Screws 22, 23, and 24 are used to move condenser lens 21 in the X, Y and Z directions, respectively.

After being emitted from laser oscillator 10, laser light 11 is collected by condenser lens 21 in axis alignment mechanism 20 and enters incident end 31 of optical fiber 30. Condenser lens 21 is positioned using screws 22 to 24 such that laser light 11 collected by condenser lens 21 enters incident end 31. This is how the axis of laser oscillator 10 and the axis of optical fiber 30 are aligned with each other.

In a typical method for optical axis alignment, condenser lens 21 is positioned by observing and maximizing the output of laser light 11 emerging from emission end 32 of optical fiber 30.

Figure 7:
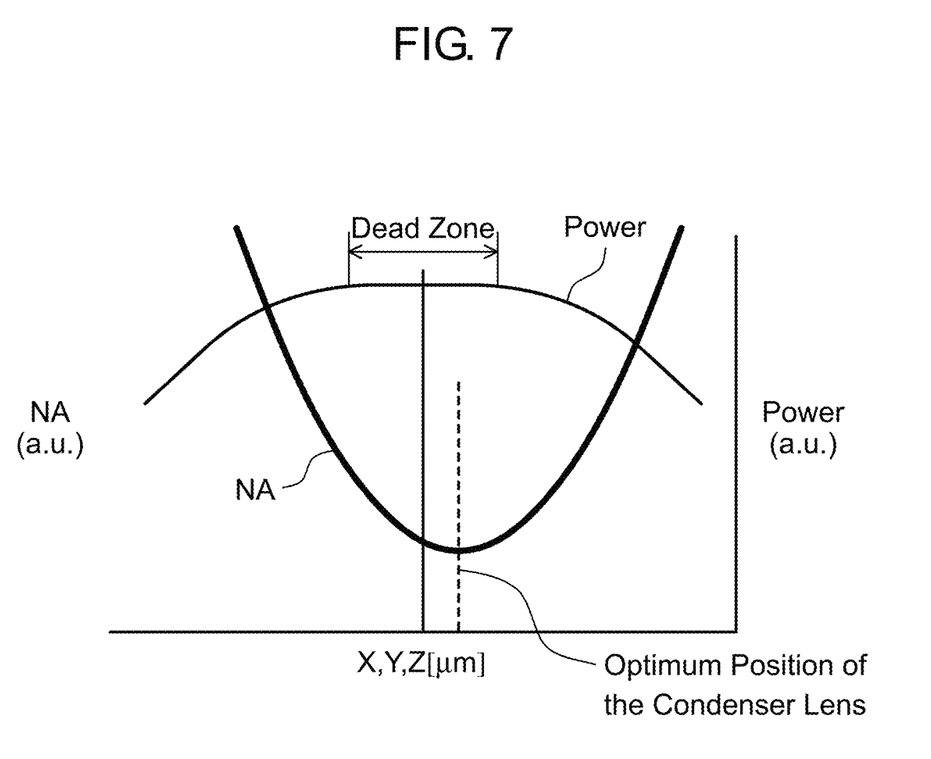
FIG. 7 illustrates changes in the laser light power and numerical aperture with respect to the position of the condenser lens in the axis alignment mechanism.

However, this typical method for optical axis alignment shown in FIG. 7 has low sensitivity to the misalignment between condenser lens 21 and incident end 31 of optical fiber 30. Moreover, in the vicinity of the position of condenser lens 21 where the laser light has a maximum output, the output of the laser light varies very little with changes in the position of condenser lens 21. This deteriorates the positioning accuracy between condenser lens 21 and optical fiber 30.

The main cause of this low sensitivity is that the spot size of laser light 11 collected by condenser lens 21 is smaller than the core diameter of optical fiber 30.

If the spot size of laser light 11 on incident end 31 of optical fiber 30 is equal to or greater than the core diameter of optical fiber 30, part of the laser light does not enter the core of optical fiber 30 thereby causing a loss of light. Meanwhile, the laser light entering the clad around the core may damage the surface of incident end 31.

Making the spot size of laser light 11 collected by condenser lens 21 smaller than the core diameter of optical fiber 30 is one approach to preventing the above-described problems.

In this case, however, even if there is a misalignment between the axis of laser light 11 on incident end 31 of optical fiber 30 and the axis of optical fiber 30, the entire amount of laser light 11 passes through optical fiber 30. As a result, laser light 11 emerging from emission end 32 of optical fiber 30 may have a spatially asymmetric shape. This may cause deflection in the shape of the laser light applied to the workpiece.

Figure 8:
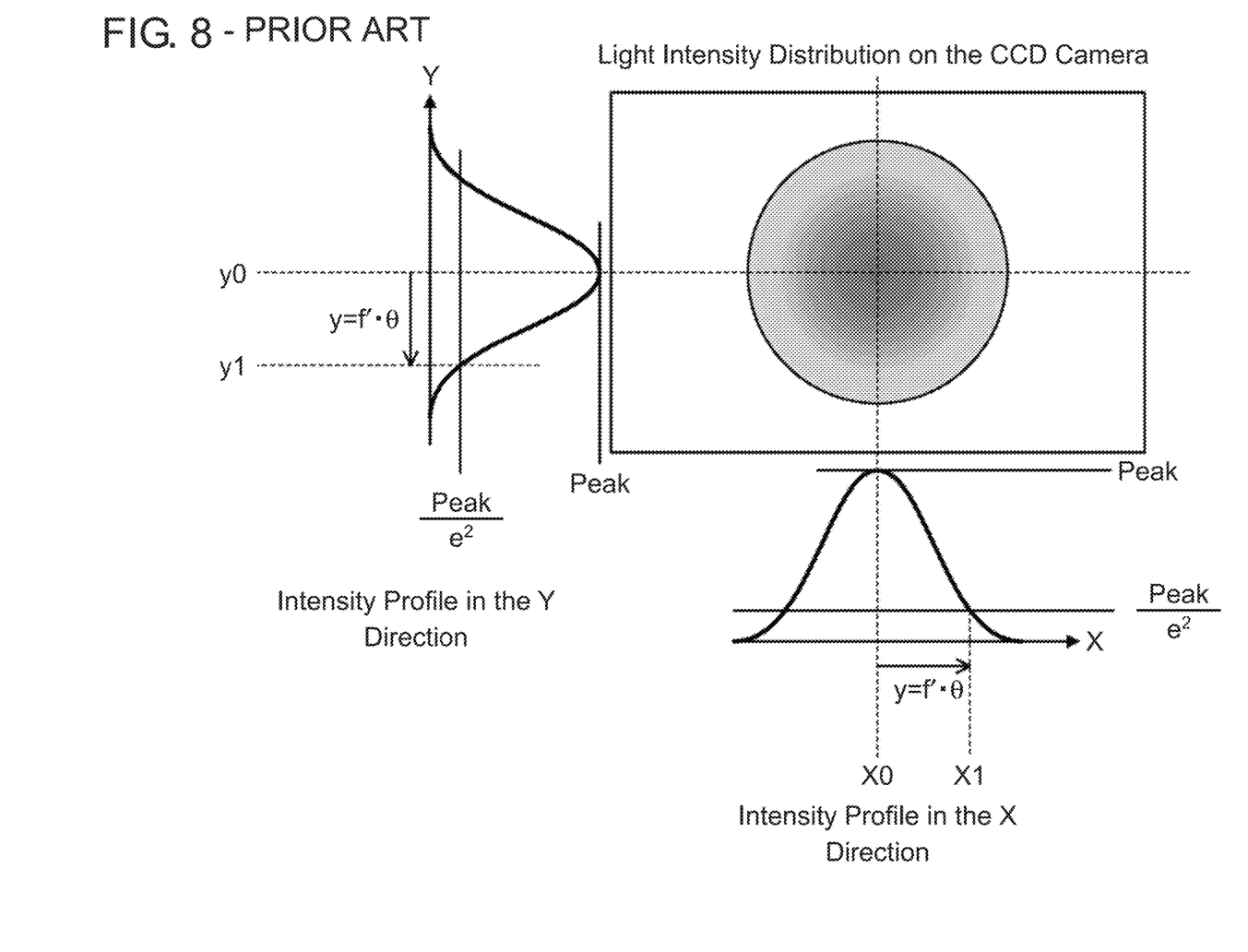
FIG. 8 is a schematic diagram illustrating the laser light intensity distribution on the CCD camera.

The present exemplary embodiment solves the above-mentioned problems by using the numerical aperture (hereinafter, NA) of laser light 13 derived from the light intensity distribution on CCD camera 100 as an indicator for positioning condenser lens 21.

As shown in FIG. 7, the NA sensitively responds to the positional changes of condenser lens 21, achieving more accurate optical axis alignment than using the output of laser light 11 as the indicator for the axis alignment.

How the NA is derived from the light intensity distribution of laser light 13 on CCD camera 100 is described as follows.

FIG. 8 illustrates the light intensity distribution of laser light 13 on CCD camera 100. This distribution is used to obtain the intensity profile both in the X and Y directions.

The intensity profile in the X direction has a position coordinate x0 where the intensity is maximum. The intensity profile in the Y direction has a position coordinate y0 where the intensity is maximum. At least one of these position coordinates x0 and y0 is calculated. The intensity profile in the X direction further has a position coordinate x1 where the intensity is $1/e^2$ of the maximum intensity. The intensity profile in the Y direction further has a position coordinate y1 where the intensity is $1/e^2$ of the maximum intensity. At least one of these position coordinates x1 and y1 is calculated.

Assuming that the difference between x0 and x1 is x and that the difference between y0 and y1 is y, then x and y satisfy Mathematical Formulas 2 and 3, respectively.

$$x = f' \times \theta \quad (2)$$

$$y = f' \times \theta \quad (3)$$

where f' represents a parameter determined from the optical system of light-collecting unit 60, and θ represents the radiation angle of laser light 13 as in Mathematical Formula 1.

Mathematical Formulas 2 and 3 are substituted into Mathematical Formula 4 shown below, to derive Mathematical Formulas 5 and 6, respectively.

$$NA = \sin \theta \quad (4)$$

$$NA = \sin(x/f') \quad (5)$$

$$NA = \sin(y/f') \quad (6)$$

As known from Mathematical Formulas 5 and 6, the NA can be found directly from the light intensity distribution on CCD camera 100. The NA can be found from the intensity profile in the X direction alone or in the Y direction alone.

Deriving the NA from the intensity profile in both directions improves NA derivation accuracy, and consequently, improves the accuracy of the optical axis alignment between laser oscillator 10 and optical fiber 30.

In either case, condenser lens 21 is positioned using lens position adjustment screws 22 to 24 so as to minimize the NA thereby aligning the axis of laser oscillator 10 with the axis of optical fiber 30. This ensures the final output of the laser light and also provides the laser light with an appropriate shape.

Figure 9:
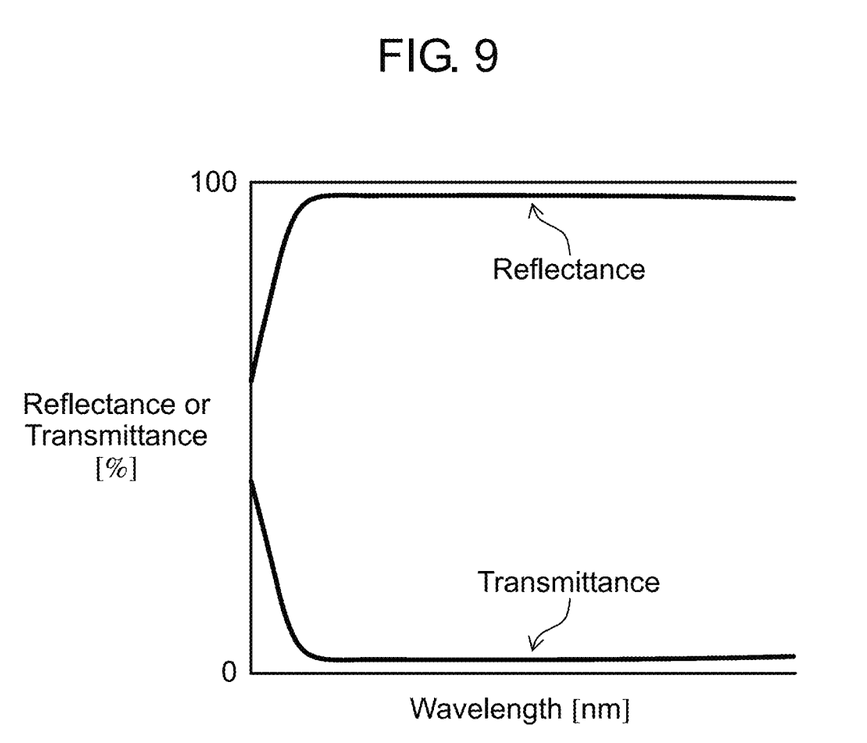
FIG. 9 illustrates other spectral characteristics of the mirror unit.

When the output of laser light 11 is as low as several tens of milliwatts to watts, mirror unit 40 shown in FIG. 1 can be a mirror with the spectral characteristics shown in FIG. 9.

In this case, in FIG. 1, most of laser light 11 incident on mirror unit 40 is reflected and incident to fθ lens 61, whereas the rest of laser light 11 enters integrating sphere 50.

Second Exemplary Embodiment

Figure 10:
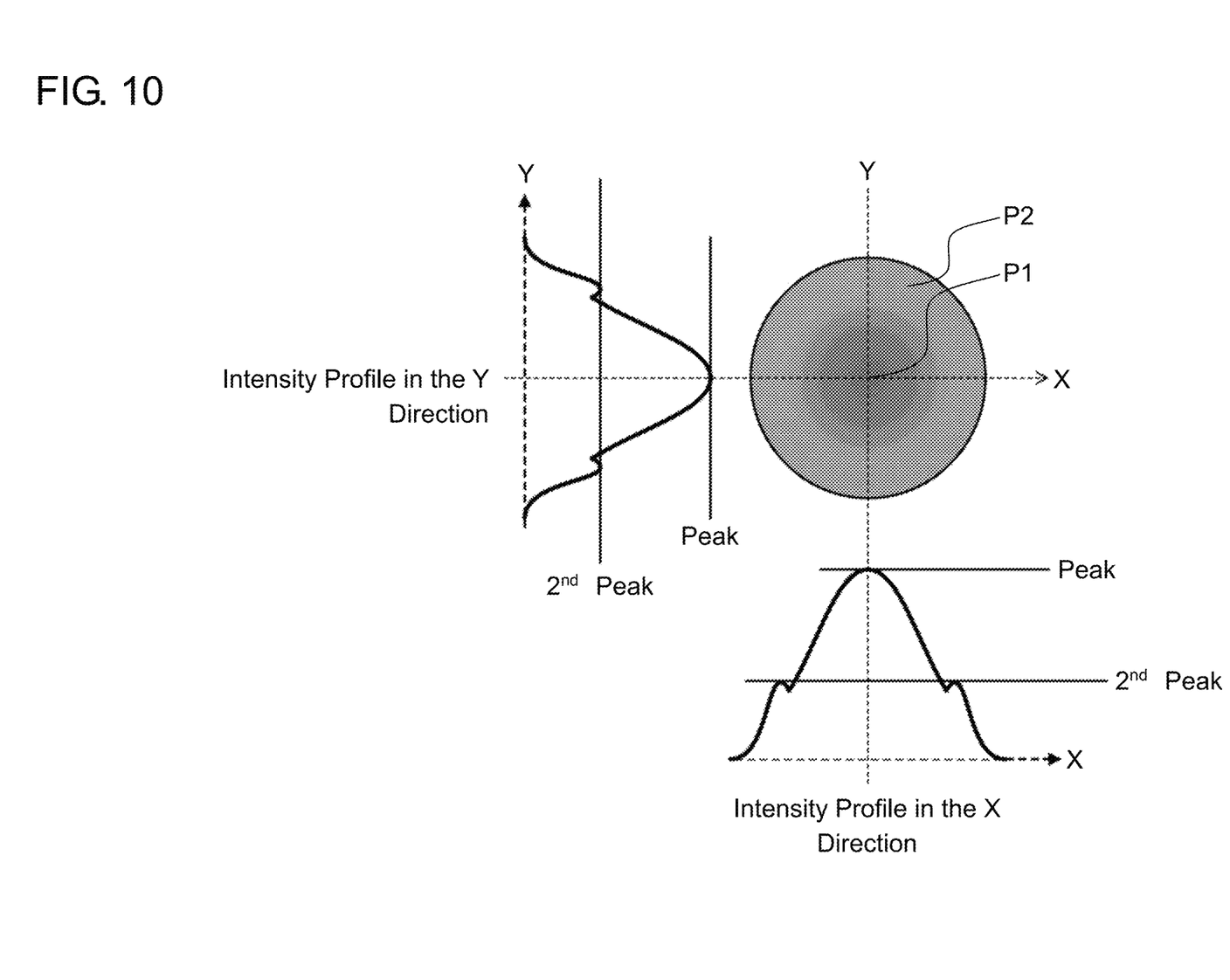
FIG. 10 is a schematic diagram illustrating the laser light intensity distribution on the CCD camera according to a second exemplary embodiment of the present invention.

FIG. 10 illustrates the light intensity distribution of the laser light on CCD camera 100 according to a second exemplary embodiment of the present invention. The second exemplary embodiment differs from the first exemplary embodiment in that optical fiber 30 is a double-clad fiber, and the indicator for positioning condenser lens 21 is a second peak position appearing on the light intensity distribution of CCD camera 100.

When optical fiber 30 is a double-clad fiber as shown in FIG. 10, the light intensity distribution on CCD camera 100 may have a position P2 where the second peak appears besides a position P1 where the intensity is maximum. The example shown in FIG. 10 includes two positions P2 in the X direction and two positions P2 in the Y direction.

The second peak is generated when part of the laser light guided in the first clad is reflected on the boundary between the first clad around the core and the second clad around the first clad.

For example, the two positions P2 in the X direction are derived and condenser lens 21 is positioned such that the midpoint between the two positions P2 is at the center of the image. This achieves the optical axis alignment between laser oscillator 10 and optical fiber 30. Alternatively, the optical axis alignment can be achieved by using the two positions P2 in the Y direction, or by using both the two positions P2 in the X direction and the two positions P2 in the Y direction.

Other Exemplary Embodiments

Laser oscillator 10 may be designed to emit laser light having multiple wavelength components as disclosed in, for example, the Japanese Unexamined Patent Application Publications Nos. 2016-73983 and 2016-112609. In this case, the laser light has different focal points on CCD camera 100 shown in FIG. 1 depending on the different wavelengths.

In such cases, CCD camera 100 can be positioned at the focal position of image-forming lens 64 with respect to the central wavelength of the laser light, thereby achieving the optical axis alignment between laser oscillator 10 and optical fiber 30.

If image-forming lens 64 is made movable along the optical axis of laser light 13, the focal point of lens 64 on the light-receiving surface of CCD camera 100 can be changed according to the different wavelength components of laser light 13. For example, image-forming lens 64 can be moved along the optical axis of laser light 13 and its focal point is shifted across the light-receiving surface of CCD camera 100 according to the corresponding wavelength component first. Then, different NAs can be found from the obtained multiple light intensity distributions so as to achieve optical axis alignment.

Optical fiber 30 used in the first exemplary embodiment is a single clad fiber, but it may alternatively be a double-clad fiber.

CCD camera 100, which receives laser light 13, can be replaced by a camera mounted with another two-dimensional optical sensor such as a CMOS image sensor.

In each of the above-described exemplary embodiments, the optical axis alignment between laser oscillator 10 and optical fiber 30 is performed using laser light 11 emerging from emission end 32 of optical fiber 30. It is also possible to attach a laser emission unit (not shown) to emission end 32. The laser emission unit is mounted with a collimator lens, a condenser lens and a protective glass, thereby emitting laser light 11.

INDUSTRIAL APPLICABILITY

The method for the optical axis alignment according to the aspect of the present invention is useful because it can ensure the final output of the laser light and also provide the laser light with an appropriate shape.

REFERENCE MARKS IN THE DRAWINGS 10 laser oscillator
20 axis alignment mechanism
21 condenser lens
22 to 24 lens position adjustment screws
30 optical fiber
40 mirror unit
50 integrating sphere
60 light-collecting unit
61 fθ lens
62 field lens
63 neutral-density filter
64 image-forming lens
100 CCD camera (light-receiving unit)
110 image processor
120 monitor
200 laser light evaluator
P2 second peak position

The invention claimed is:

1. A method for optical axis alignment between a laser oscillator and an optical fiber as a double-clad fiber, by using a laser light evaluator, the laser light evaluator including a light-receiving unit having a light-receiving surface configured to receive laser light emitted from the laser oscillator and guided by the optical fiber, through a light-collecting unit having an fθ lens, and a monitor displaying at least one of an intensity profile in an X direction and an intensity profile in a Y direction for deriving a numerical aperture of the laser light radiated from the optical fiber, the method comprising:
modifying a shape of the laser light by the fθ lens so that a radiation angle distribution of the laser light is converted into a position distribution;
receiving laser light on the light-receiving surface of the light-receiving unit, the laser light having been emitted from the laser oscillator and guided by the optical fiber via an axis alignment mechanism situated between the laser oscillator and the optical fiber; and
aligning an axis of the laser oscillator with an axis of the optical fiber using the axis alignment mechanism based on a light intensity distribution of the laser light received on the light-receiving surface of the light-receiving unit, the aligning being performed while monitoring the numerical aperture of the laser light radiated from the optical fiber until the axis of the laser oscillator and the axis of the optical fiber are aligned such that the numerical aperture of the laser light derived from the light intensity distribution of the laser light received on the light-receiving surface reaches a minimum value, the numerical aperture being a function of a radiation angle of the laser light radiated from the optical fiber, the numerical aperture being derived from at least one of following formulas indicating the intensity profile in the X direction and the intensity profile in the Y direction by converting the radiation angle distribution of the laser light into the position distribution with the fθ lens:

$$NA = \sin\theta$$

$$NA = \sin(x/f), \text{ and}$$

$$NA = \sin(y/f)$$

where
NA represents the numerical aperture,
x represents a length between a first position where an intensity has a peak in the intensity profile in the X direction and a second position where the intensity is $1/e^2$ of the peak in the intensity profile in the X direction,
y represents a length between a third position where the intensity has a peak in the intensity profile in the Y direction and a fourth position where the intensity is $1/e^2$ of the peak in the intensity profile in the Y direction,
f represents a parameter determined by an optical system, and
θ represents a radiation angle of laser light,
wherein the aligning of the axis of the laser oscillator further comprises
the laser light emitted from the laser oscillator being incident on the optical fiber via the axis alignment mechanism, the laser light guided by the optical fiber emitting to the light collecting unit, the laser light having the shape modified by the fθ lens being received on the light-receiving surface of the light-receiving unit, and the intensity profile of the laser light received on the light-receiving surface being displayed on the monitor,
performing at least one of a calculation of x and a calculation of y, the calculation of x being performed by monitoring the first position where an intensity has a peak in the intensity profile in the X direction and the second position where the intensity is $1/e^2$ of the peak in the intensity profile in the X direction with the monitor displaying the intensity profile, the calculation of y being performed by monitoring the third position where the intensity has the peak in the intensity profile in the Y direction and the fourth position where the intensity is $1/e^2$ of the peak in the intensity profile in the Y direction with the monitor displaying the intensity profile, and
aligning the axis of the laser oscillator with the axis of the optical fiber while monitoring the numerical aperture of the laser light using the axis alignment mechanism such that at least one of the numerical aperture of the laser light in the X direction and the numerical aperture of the laser light in the Y direction reaches the minimum value.

2. The method according to claim 1, wherein the aligning is performed such that the light intensity distribution includes:
  a fifth position where the laser light radiated from the optical fiber has a maximum output; and
  a dead zone having a small output variation of the laser light, the dead zone being located near the fifth position.

3. The method according to claim 1, wherein
the optical fiber is the double-clad fiber comprising a core, a first clad around the core, and a second clad around the first clad, and
the aligning is performed based on a sixth position where the intensity has a second peak, the second peak appearing in the light intensity distribution on the light-receiving surface by the laser light being reflected on a boundary between the first clad and the second clad.

4. The method according to claim 1, wherein
the laser light received on the light-receiving surface has a plurality of wavelength components, and
the numerical aperture of the laser light radiated from the optical fiber is derived from the light intensity distribution for each of the plurality of wavelength components.

5. The method according to claim 1, wherein the laser light evaluator has the light-collecting unit, and the light-collecting unit further includes:
  a mirror unit configured to deflect, toward the light-receiving unit, part of the laser light radiated from the optical fiber;
  the fθ lens configured to modify a shape of the laser light deflected by the mirror unit such that a radiation angle distribution of the laser light is converted into a position distribution;
  a field lens disposed near a focal position of the fθ lens and configured to transmit the laser light with the shape modified by the fθ lens and to change a direction of travel of the laser light;
  a neutral-density filter configured to attenuate the laser light that has passed through the field lens; and
  an image-forming lens configured to collect the laser light that has been attenuated by the neutral-density filter onto the light-receiving surface.

* * * * *